United States Patent
Tsai et al.

(10) Patent No.: US 9,190,904 B2
(45) Date of Patent: Nov. 17, 2015

(54) DC CONVERSION CIRCUIT

(71) Applicant: INDUSTRIAL TECHNOLOGY RESEARCH INSTITUTE, Hsinchu (TW)

(72) Inventors: Wen-Tien Tsai, Pingtung County (TW); Ching-Ran Lee, Kinmen County (TW); Po-Yen Chen, Taipei (TW); Ching-Tsai Pan, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 54 days.

(21) Appl. No.: 13/941,271

(22) Filed: Jul. 12, 2013

(65) Prior Publication Data

US 2014/0132231 A1 May 15, 2014

(30) Foreign Application Priority Data

Nov. 14, 2012 (TW) .............................. 101142520 A

(51) Int. Cl.
*G05F 1/00* (2006.01)
*H02M 3/155* (2006.01)
*H02M 1/00* (2007.01)

(52) U.S. Cl.
CPC ...... *H02M 3/155* (2013.01); *H02M 2001/0058* (2013.01); *Y02B 70/1491* (2013.01)

(58) Field of Classification Search
USPC ......... 323/208, 222, 223, 232, 233, 247, 248, 323/259, 265, 290, 292, 293, 271, 282; 363/21.02, 84, 88, 89, 90
See application file for complete search history.

(56) References Cited

U.S. PATENT DOCUMENTS

| | | |
|---|---|---|
| 5,694,302 A | 12/1997 | Faulk |
| 6,661,683 B2 | 12/2003 | Botker et al. |
| 7,511,563 B2 | 3/2009 | Botker et al. |
| 7,973,487 B2 | 7/2011 | Vancourt et al. |

(Continued)

FOREIGN PATENT DOCUMENTS

| | | |
|---|---|---|
| TW | I252589 | 4/2006 |
| TW | I297977 | 6/2008 |

(Continued)

OTHER PUBLICATIONS

C.H. Wu et al., "A Low-Ripple Charge Pump with Continuous Pumping Current Control," IEEE, 2008, pp. 722-725.

(Continued)

*Primary Examiner* — Nguyen Tran
(74) *Attorney, Agent, or Firm* — Muncy, Geissler, Olds & Lowe, P.C.

(57) ABSTRACT

A DC conversion circuit in the disclosure includes a buck-boost converter and a resonant stage circuit. The buck-boost converter has two input ends, a negative output end and a positive output end. The buck-boost converter receives a first DC signal via its two input ends, and outputs a second DC signal via its two output ends. The resonant stage circuit has two input ends and two output ends. The resonant stage circuit receives the second DC signal via its two input ends, converts the second DC signal into energy for power charging, and outputs the energy to a load via its two output ends. Then, the resonant stage circuit converts the energy, which is used for power charging, to form a negative voltage by a resonance effect, and outputs the energy to the load via its two output ends.

13 Claims, 9 Drawing Sheets

(56) References Cited

U.S. PATENT DOCUMENTS

| | | |
|---|---|---|
| 7,977,927 B2 | 7/2011 | Williams |
| 8,013,666 B1 | 9/2011 | Liu |
| 2011/0057639 A1* | 3/2011 | Chung et al. ............ 323/311 |
| 2014/0084898 A1* | 3/2014 | Pan et al. ............... 323/311 |

FOREIGN PATENT DOCUMENTS

| | | |
|---|---|---|
| TW | 201014132 | 4/2010 |
| TW | 201101659 | 1/2011 |
| TW | I337795 B | 2/2011 |
| TW | I343695 B | 6/2011 |
| TW | I358884 B | 2/2012 |
| TW | M437003 | 9/2012 |

OTHER PUBLICATIONS

F. Bedeschi et al., "A Low-Ripple Voltage Tripler," IEEE, 2006, pp. 2753-2756.

F. Cong et al., "A Novel Low-Ripple Charge Pumpt for PCM," IEEE, 2011, pp. 322-324.

A. Rao et al., "Buck-Boost Switched-Capacitor DC-DC Voltage Regulator Using Delta-Sigma Control Loop," IEEE, 2002, pp. IV-743-IV-746.

E. Babaei et al., "Operational Modes and Output-Voltage-Ripple Analysis and Design Considerations of Buck-Boost DC-DC Converters," IEEE Transactions on Industrial Electronics, vol. 59, No. 1, Jan. 2012, pp. 381-391.

* cited by examiner

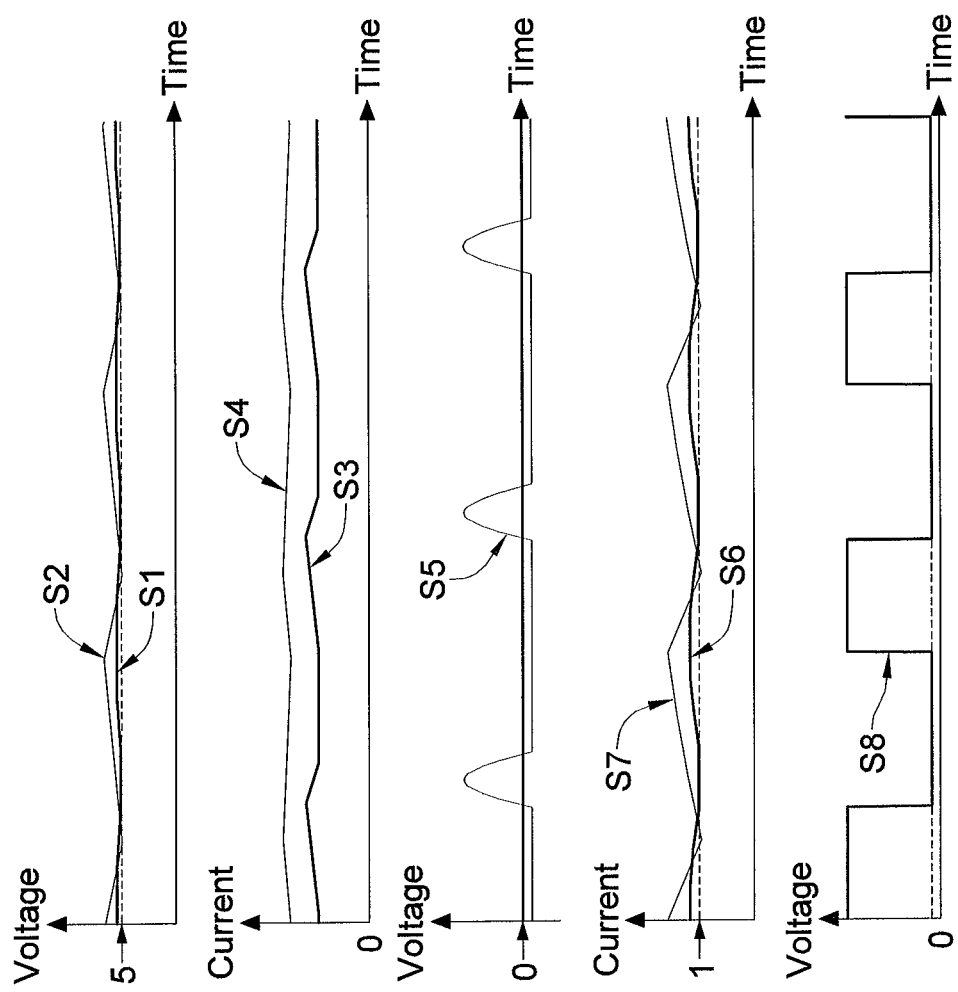

DC CONVERSION CIRCUIT

CROSS-REFERENCE TO RELATED APPLICATIONS

This non-provisional application claims priority under 35 U.S.C. §119(a) on Patent Application No(s). 101142520 filed in Taiwan, R.O.C. on Nov. 14, 2012, the entire contents of which are hereby incorporated by reference.

TECHNICAL FIELD

The disclosure relates to a DC conversion circuit.

BACKGROUND

Generally speaking, a direct current (DC) conversion circuit is disposed with an energy storage element. The inductance value of the energy storage element affects the response speed of the input current and the output voltage ripple in the DC conversion circuit. If the inductance value of the energy storage element is relatively smaller, the response speed of the input current of the DC conversion circuit is relatively faster, but the output voltage ripple is relatively larger. On the contrary, if the inductance value of the energy storage element is relatively larger, the response speed of the input current of the DC conversion circuit is relatively slower, but the output voltage ripple is relatively smaller.

Therefore, for general DC conversion circuits, usually inductors with relatively smaller inductance values and capacitors with relatively larger capacitance value are employed. In other words, the energy storage element with a relatively smaller inductance value and a relatively larger capacitance value is employed. Thus, the DC conversion circuit can have a relatively faster response speed of the input current and a relatively smaller output current ripple. Furthermore, an electrolytic capacitor is usually employed as the capacitor with a relatively larger capacitance value, so as to achieve the relatively faster response speed and the relatively smaller output current ripple.

However, because an electrolytic capacitor is easily affected by external circumstances and factors such as the operation of switch and temperature, the electrolytic capacitor has a shorter life expectancy than other types of capacitors made of different materials. As a result, the life expectancy of the DC conversion circuit is also shortened.

SUMMARY

The disclosure relates to a DC conversion circuit, which includes a buck-boost converter and a resonant stage circuit. The buck-boost converter has two input ends, a negative output end and a positive output end. The buck-boost converter receives a first DC signal via its two input ends, and outputs a second DC signal via its two output ends. The resonant stage circuit has two input ends and two output ends. The resonant stage circuit receives the second DC signal via its two input ends, converts the second DC signal into energy for power charging, and outputs the energy to a load via its two output ends. Then, the resonant stage circuit converts the energy, which is used for power charging, to form a negative voltage by a resonance effect, and outputs the energy to the load via its two output ends.

BRIEF DESCRIPTION OF THE DRAWINGS

The present disclosure will become more fully understood from the detailed description given herein below for illustration only, and thus does not limit the present disclosure, wherein:

FIG. 2C is a simulation waveform diagram showing output currents, inductive currents, capacitor voltages, output voltages and a control signal implemented in the DC conversion circuits in FIG. 2A and FIG. 2B;

DETAILED DESCRIPTION OF PREFERRED EMBODIMENTS

Figure 1:
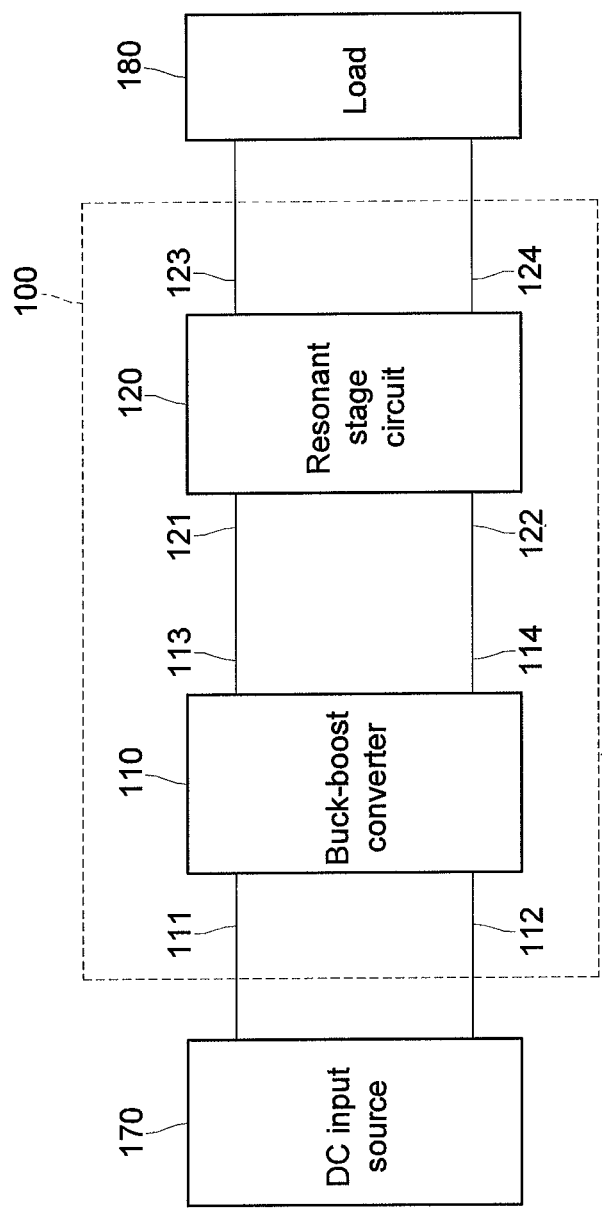
FIG. 1 is a block diagram of a DC conversion circuit according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the following embodiments, elements having the same label represent identical or similar components.

FIG. 1 is a block diagram of a direct current (DC) conversion circuit according to an embodiment of the disclosure. A DC conversion circuit 100 of this embodiment is used for coupling with a load 180 in order to supply an operation voltage to the load 180. For the load 180, the current passing through the load 180 is sensitive to the voltage flicker of the DC conversion circuit 100. The load 180 can be, for example, a light emitting diode (LED) or an organic solid-state lighting.

The DC conversion circuit 100 includes a buck-boost converter 110 and a resonant stage circuit 120. The buck-boost converter 110 has two input ends 111 and 112 and two output ends 113 and 114, i.e. a positive output end and a negative output end. The two input ends 111 and 112 of the buck-boost converter 110 are, for example, coupled to a DC input source 170 in order to receive a first DC signal outputted by the DC input source 170. The buck-boost converter 110 processes the first DC signal and outputs a second DC signal via the two output ends 113 and 114 of the buck-boost converter 110. In this embodiment, the DC input source 170 can be, for example, a pulse power source or a DC power source. Specifically, the DC power source can further include a DC voltage source or a DC current source.

The resonant stage circuit 120 has two input ends 121 and 122 and two output ends 123 and 124. The two input ends 121 and 122 of the resonant stage circuit 120 are coupled to the output ends 113 and 114 of the buck-boost converter 110. The two input ends of the resonant stage circuit 120 are used for receiving the second DC signal and converting the second DC signal into energy for power charging. Then, the energy is outputted to the load 180 via the two output ends of the resonant stage circuit 120. Furthermore, the resonant stage circuit 120 converts the energy which is used for power charging, to form a negative voltage through its resonance effect, and the energy is outputted to the load 180 via the two output ends of the resonant stage circuit 120.

Firstly, after the DC conversion circuit 100 begins to operate, the buck-boost converter 110 converts the received first DC signal into a second DC signal by controlling the switching between the buck and boost phases of the operation. The second DC signal is outputted to the resonant stage circuit 120, so as to increase the voltage of the resonant stage circuit 120 speedily, and to simultaneously transmit energy to the load 180. When the second DC signal is disabled, by the resonance effect, the energy stored in the resonant stage circuit 120 is converted into an inductive current for charging. This may suppress output voltage ripple when the input energy is increased.

When the energy stored in the resonant stage circuit 120 is converted into the inductor current, the polarity of the voltage between the input and output of the resonant stage circuit 120 is reversed so as to form a negative voltage for charging. Herein, the circuit structure of the DC conversion circuit 100 is changed. Moreover, the energy is transmitted to the load 180 via the resonant stage circuit 120 to supply an operating voltage to the load 180. The resonant stage circuit 120 includes a filter element, so as to suppress the output voltage ripple when the input energy is disabled. As a result, the DC conversion circuit 100 of this embodiment may have a faster input response, a smaller output voltage ripple and a longer life.

Figure 2A:
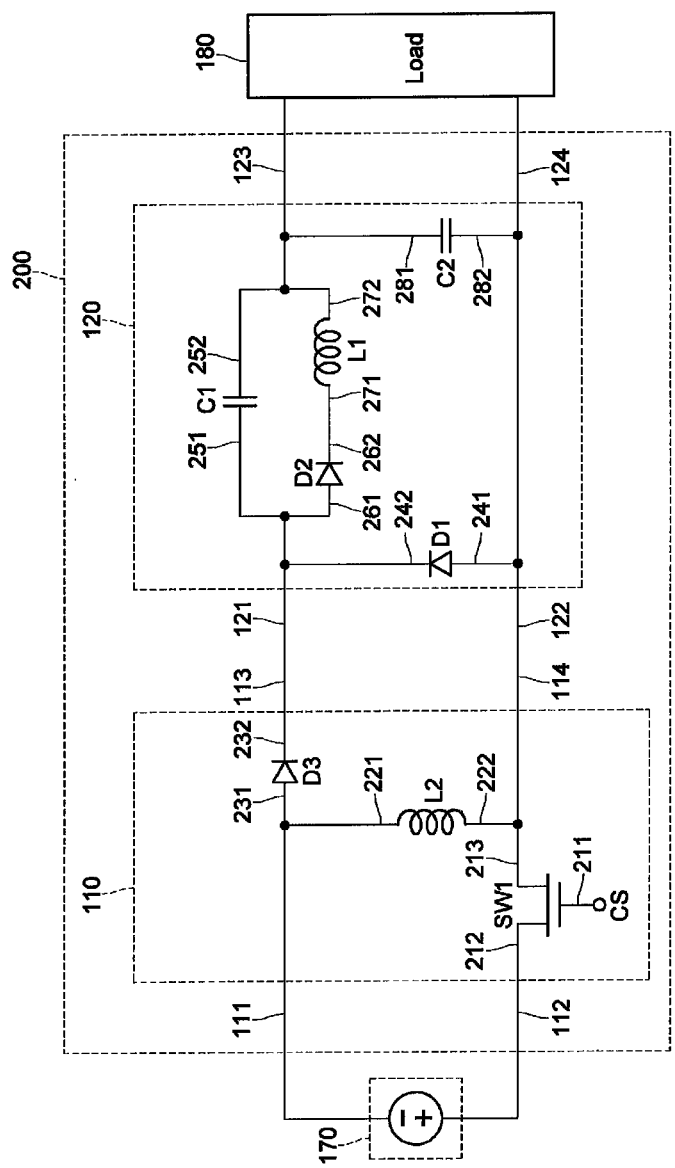
FIG. 2A is a schematic circuit diagram of a buck-boost converter implemented in the DC conversion circuit in FIG. 1 according to an embodiment of the disclosure.

FIG. 2A is a schematic circuit diagram of a DC conversion circuit in FIG. 1 according to an embodiment of the disclosure. The DC input source 170 of the second embodiment is, for example, a DC voltage source. A positive end of the DC voltage source is coupled to the input end 112 of the buck-boost converter 110, and a negative end of the DC voltage source is coupled to the input end 111 of the buck-boost converter 110.

A DC conversion circuit 200 includes the buck-boost converter 110 and the resonant stage circuit 120. The buck-boost converter 110 comprises a switch SW1, a second inductor L2 and a third diode D3. The switch SW1 has a first end 211, a second end 212 and a third end 213. The first end 211 of the switch SW1 receives a control signal CS. The second end 212 of the switch SW1 is coupled to one of the two input ends 111 and 112 of the buck-boost converter 110, i.e. the input end 112 of the buck-boost converter 110. The third end 213 of the switch SW1 is coupled to the output end 114 of the buck-boost converter 110.

In this embodiment, the switch SW1, for example, is a N-type transistor. The first end 211, the second end 212 and the third end 213 of the switch SW1 are a gate end, a drain end and a source end of the N-type transistor respectively. In some embodiments, the switch SW1 can also be a P-type transistor or other switch elements.

The second inductor L2 has a first end 221 and a second end 222. The first end 221 of the second inductor L2 is coupled to the other one of the two input ends 111 and 112 of the buck-boost converter 110, i.e. the input end 111 of the buck-boost converter 110, and the second end 215 of the second inductor L2 is coupled to the third end 213 of the switch SW1.

The third diode D3 has an anode end 231 and a cathode end 232. The anode end 231 of the third diode D3 is coupled to the first end 221 of the second inductor L2. The cathode end 232 of the third diode D3 is coupled to the positive end 113, i.e. the positive output end, of the buck-boost converter 110.

The resonant stage circuit 120 comprises a first diode D1, a first capacitor C1, a second diode D2, a first inductor L1 and a second capacitor C2. The first diode D1 has an anode end 241 and a cathode end 242. The cathode end 242 of the first diode D1 is coupled to the output end 113, i.e. the positive output end, of the buck-boost converter 110 and the input end 122 of the resonant stage circuit 120. The anode end 241 of the first diode D1 is coupled to the output end 114, i.e. the negative output end, of the buck-boost converter 110 and the input end 121 of the resonant stage circuit 120.

The first capacitor C1 has a first end 251 and a second end 252. The first end 251 of the first capacitor C1 is coupled to the cathode end 242 of the first diode D1. The second end 252 of the first capacitor C1 is coupled to the output end 123 of the resonant stage circuit 120 and the load 180.

The second diode D2 has an anode end 261 and a cathode end 262. The anode end 261 of the second diode D2 is coupled to the cathode end 242 of the first diode D1.

The first inductor L1 has a first end 271 and a second end 272. The first end 271 of the first inductor L1 is coupled to the cathode end 262 of the second diode D2. The second end 272 of the first inductor L1 is coupled to the second end 252 of the first capacitor C1.

The second capacitor C2 has a first end 281 and a second end 282. The first end 281 of the second capacitor C2 is coupled to the second end 252 of the first capacitor C1. The second end 282 of the second capacitor C2 is coupled to the output end 124 of the resonant stage circuit 120 and the load 180. In this embodiment, the input end 122 of the resonant stage circuit 120 is directly coupled to the output end 124 of the resonant stage circuit 120.

Firstly, after the DC conversion circuit 200 begins to operate, the buck-boost converter 110 converts the received first DC signal into a second DC signal by controlling the switching between the buck and boost phases of the operation. The second DC signal is outputted to the resonant circuit formed by the first inductor L1 and the first capacitor C1, so that the voltage across the first capacitor C1 is increased rapidly and the energy is transferred to the second capacitor C2 and the load. When the second DC signal is disabled, through the resonance effect between the first inductor L1 and the first capacitor C1, the stored energy in the first capacitor C1 is converted into the inductor current, and charges the second capacitor C2, so as to divide the voltage across the two capacitors. This may suppress the output voltage ripple caused by the increase of input energy.

When the energy stored in the first capacitor C1 is converted into the inductor current, the polarity of the voltage across the first capacitor C1 is reversed to form a negative voltage. Herein, the first diode D1 is conducted, and the circuit structure of the DC conversion circuit 200 is changed. Moreover, the first inductor L1, the first capacitor C1 and the second capacitor C2 transfer the stored energy as the required working voltage to the load 180. The first inductor L1, the first capacitor C1 and the second capacitor C2 cooperate to form a filter element, so as to suppress the output voltage ripple when the input energy is disabled. As a result, the DC conversion circuit 200 of the embodiment may have a faster input response, a smaller output voltage ripple and a longer life.

In addition, the inductance value of the first inductor L1 in the embodiment can be designed to be smaller than that of a regular inductor to allow a larger current to flow through the first inductor L1, and the capacitance value of the first capacitor C1 can be designed to be smaller than that of the second capacitor C2 to obtain a larger negative voltage across the first capacitor C1 when the polarity inversion occurs to the first capacitor C1. When the polarity inversion and the negative voltage occur to the first capacitor C1, and when the first inductor L1 is being charged, the second diode D2 suppresses the negative voltage. This may reduce the energy loss, and provide the DC conversion circuit 200 with better operation conditions.

Operational Example 1

Considering that the first inductor L1 and the second inductor. L2 operate in a continuous conduction mode (CCM). Firstly, when the DC conversion circuit 200 starts operating, the control signal CS is at a high logic level ("1"). Herein, the switch SW1 is turned on, and the DC conversion circuit 200 enters into the first mode. The first DC signal generated by the DC input source 170 is transmitted to the second inductor L2 through the switch SW1 to charge the second inductor L2. On the other hand, when the second diode D2 is conducted, the first inductor L1, the first capacitor C1 and the second capacitor C2 release energy to the load 180 simultaneously.

Subsequently, when the control signal CS is switched to at a low logic level ("0"), the switch SW1 is turned off, and the DC conversion circuit 200 enters into the second mode. Herein, the third diode D3 and the second diode D2 are conducted, and the energy stored in the second inductor L2 forms the second DC signal via the third diode D3. The second DC signal is transmitted to the resonant circuit formed by the first inductor L1 and the first capacitor C1, so as to charge the first inductor L1, the first capacitor C1 and the second capacitor C2. In other words, the second DC signal (that is the stored energy voltage of the second inductor L2) quickly transfers the energy to the second capacitor C2 through the first inductor L1 and the first capacitor C1. This may effectively suppress the output voltage ripple caused by the increase of the input energy.

When the stored energy in the first capacitor C1 is converted to the inductor current, the polarity of the voltage across the first capacitor C1 is inverted. Herein, the first diode D1 is conducted, and the circuit structure of the DC conversion circuit 200 is changed. When the first diode D1 is conducted, the DC conversion circuit 200 enters into the third mode. In this mode, the first capacitor C1 and the first inductor L1 form a loop via the second diode D2, whereas the first capacitor C1 and the first inductor L1 form another loop via the second inductor L2 and the third diode D3. The two loops respectively cooperate with the second capacitor C2 to transfer the stored energy as the working voltage to the load 180. Accordingly, the DC conversion circuit 200 completes a full cycle of operation.

Operational Example 2

Considering that the first inductor L1 operates in a CCM and the second inductor L2 operates in a discontinuous conduction mode (DCM). The DC conversion circuit 200 in the operational example 2 has a first mode, a second mode, a third mode and a fourth mode, wherein the first mode, the second mode and the third mode can refer to the explanations in the Operational Example 1 and will not be described again.

When the stored energy in the second inductor L2 is completely released, the DC conversion circuit 200 enters into the fourth mode. In this mode, the first capacitor C1 and the first inductor L1 form a loop via the second diode D2. The loop cooperates with the second capacitor C2 to continuously deliver the stored energy, as the working voltage, to the load 180. Accordingly, the DC conversion circuit 200 completes a full cycle of operation.

Operational Example 3

Considering that the first inductor L1 and the second inductor L2 operate in a DCM. The DC conversion circuit 200 in the operational example 3 has a first mode, a second mode, a third mode a fourth mode and a fifth mode, wherein the first mode, the second mode, the third mode and the fourth mode cab refer to the explanations in the Operational Examples 1 and 2 and will not be described again.

When the stored energy in the resonant circuit formed by the first inductor L1 and the first capacitor C1, is completely released, the DC conversion circuit 200 enters into the fifth mode. In this mode, only the second capacitor C2 continuously delivers the stored energy, as the needed working voltage, to the load 180. Accordingly, the DC conversion circuit 200 completes a full cycle of operation. In addition, based on the operations described above, the DC conversion circuit 200 can have a faster input response, a smaller output voltage ripple, and a longer life.

The capacitance value of the first capacitor C1 can be designed to be smaller than that of the second capacitor C2, so that when the polarity of the voltage across the first capacitor C1 is reversed, the negative voltage across the first capacitor C1 will be larger than the voltage across the second capacitor C2. Herein, the first diode D1 will be turned on.

Figure 2B:
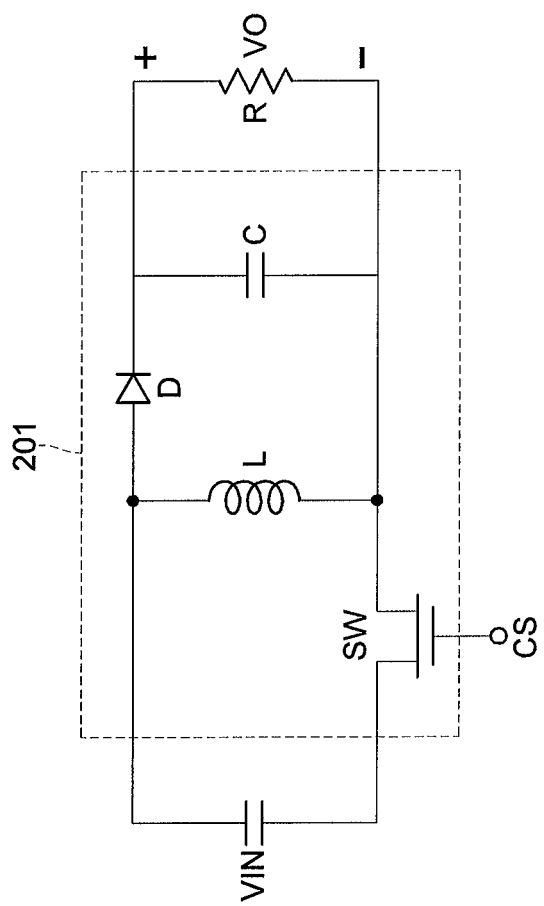
FIG. 2B is a schematic circuit diagram of a buck-boost converter implemented in a DC conversion circuit.

For instance, the operation difference between the DC conversion circuit 200 and a DC conversion circuit 201 in FIG. 2B is illustrated via information shown in FIG. 2C which shows output currents, inductive currents, capacitor currents, output voltages and a control signal implemented in the DC conversion circuits in FIG. 2A and FIG. 2B. The DC conversion circuit 201 includes a switch SW, an inductor L, a capacitor C and a diode D. The DC conversion circuit 201 is supplied with a DC input source VIN and outputs an output voltage VO to a load, e.g. a resistance R.

In this example, circuit parameters for the DC conversion circuit 201 are listed in Table 1, and circuit parameters for the DC conversion circuit 200 are listed in Table 2.

TABLE 1

| | Values |
|---|---|
| Inductor | 264 uH |
| Capacitor | 10 uF |
| DC input source | 12 V |
| Output voltage | 5 V |
| Switch frequency of control signal | 100 KHz |
| Load | 5 Ω |

TABLE 2

| | Values |
|---|---|
| First inductor | 47 uH |
| Second inductor | 220 uH |
| First capacitor | 10 nF |
| Second capacitor | 10 uF |
| DC input source | 12 V |
| Output voltage | 5 V |
| Switch frequency of control signal | 100 KHz |
| Load | 5 Ω |

In FIG. 2C, a curve S1 represents an output voltage outputted from the DC conversion circuit 200 to the load 180, a curve S2 represents an output voltage VO of the DC conversion circuit 201, a curve S3 represents an inductive current passing through the second inductor L2 in the DC conversion circuit 200, a curve S4 represents an inductive current passing through the inductor L in the DC conversion circuit 201, a curve S5 represents a capacitor voltage of the first capacitor C1 in the DC conversion circuit 200, a curve S6 represents an output current of the DC conversion circuit 200, a curve S7 represents an output current of the DC conversion circuit 201, and a curve S8 represents a control signal CS.

An output voltage ripple of the DC conversion circuit 200 is 0.086 V, and an output voltage ripple of the DC conversion circuit 201 is 0.248 V. The output voltage ripple of the DC conversion circuit 201 is 2.88 times of the output voltage ripple of the DC conversion circuit 200. Accordingly, the DC conversion circuit 200 has lower voltage ripples.

Figure 3:
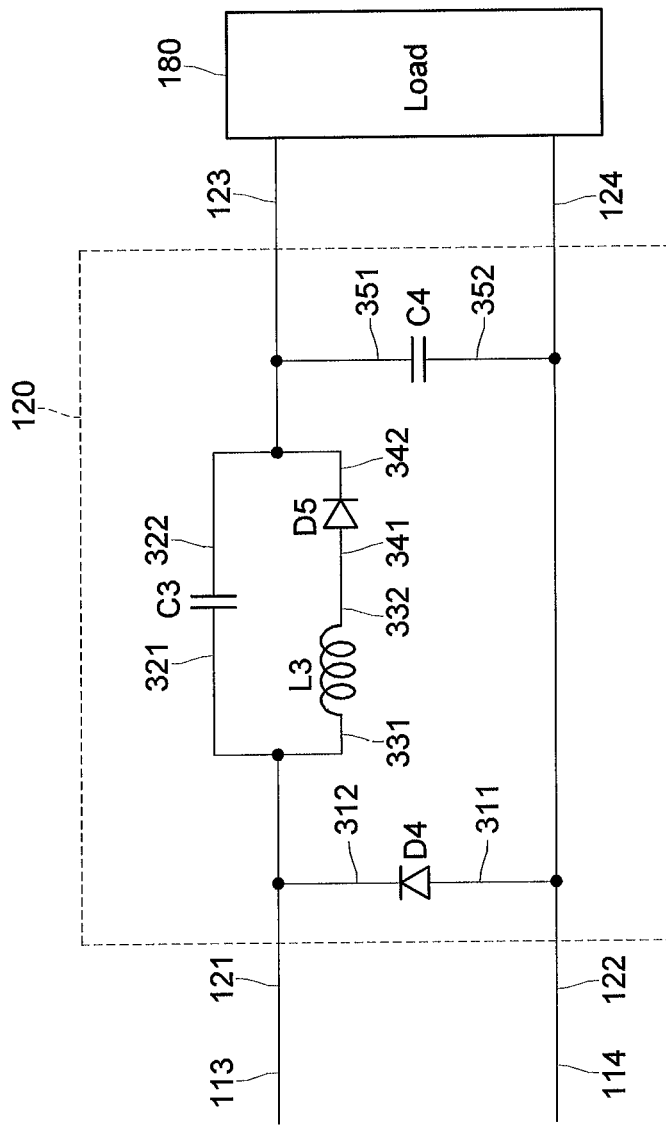
FIG. 3 is a schematic circuit diagram of the resonant stage circuit implemented in the DC conversion circuit in FIG. 1 according to an embodiment of the disclosure.

FIG. 3 is a schematic circuit diagram of the resonant stage circuit implemented in the DC conversion circuit in FIG. 1 according to an embodiment of the disclosure. The resonant stage circuit 120 includes a first diode D4, a first capacitor C3, a first inductor L3, a second diode D5 and a second capacitor C4. The first diode D4 has an anode end 311 and a cathode end 312. The cathode end 312 of the first diode D4 is coupled to the output end 113, i.e. the positive output end, of the buck-boost converter 110 and the input end 121 of the resonant stage circuit. The anode end 311 of the first diode D4 is coupled to the output end 114, i.e. the negative output end, of the buck-boost converter 110 and the input end 114 of the resonant stage circuit 120.

The first capacitor C3 has a first end 321 and a second end 322. The first end 321 of the first capacitor C3 is coupled to the cathode end 312 of the first diode. The second end 322 of the first capacitor C3 is coupled to the output end 123 of the resonant stage circuit 120 and the load 180. The first inductor L3 has a first end 331 and a second end 332. The first end 331 of the first inductor L3 is coupled to the cathode end 312 of the first diode D4.

The second diode D5 has an anode end 341 and a cathode end 342. The anode end 341 of the second diode D5 is coupled to the second end 332 of the first inductor L3. The cathode end 342 of the second diode D5 is coupled to the second end 322 of the first capacitor C3.

The second capacitor C4 has a first end 351 and a second end 352. The first end 351 of the second capacitor C4 is coupled to the second end 322 of the first capacitor C3. The second end 352 of the second capacitor C4 is coupled to the output end 124 of the resonant stage circuit 120 and the load 180. In this embodiment, the input end 122 of the resonant stage circuit 120 is directly coupled to the output end 124 of the resonant stage circuit 120. A capacitance value of the first capacitor C3 is smaller than a capacitance value of the second capacitor C4.

Figure 4:
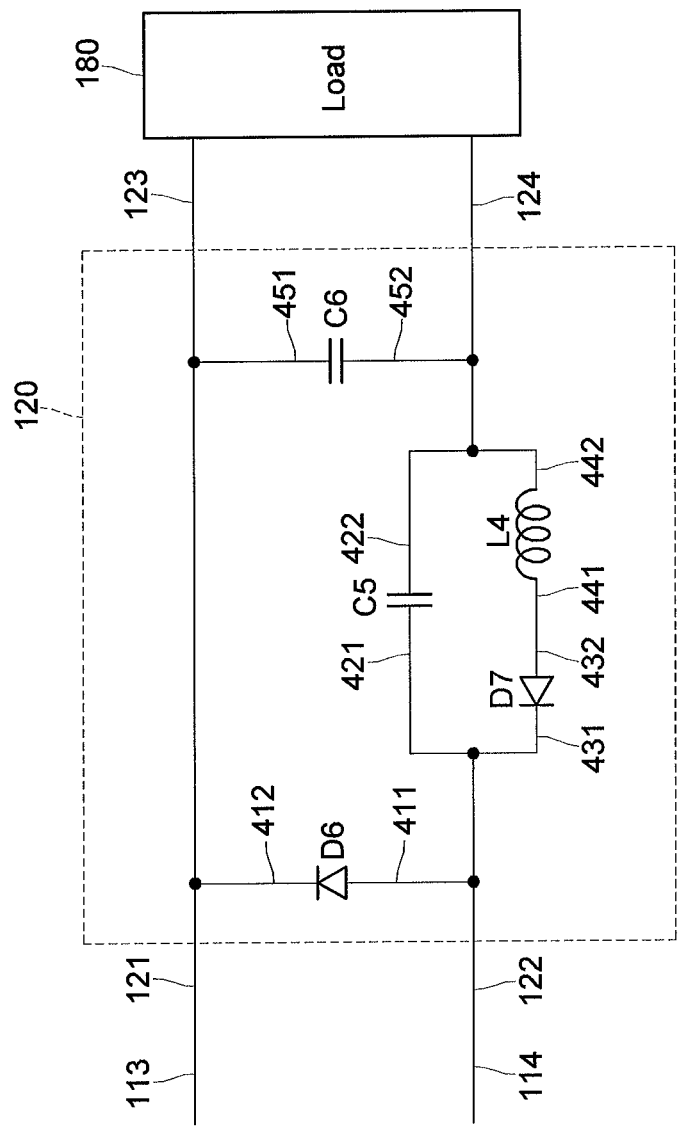
FIG. 4 is a schematic circuit diagram of the resonant stage circuit implemented in the DC conversion circuit in FIG. 1 according to an embodiment of the disclosure.

FIG. 4 is a schematic circuit diagram of the resonant stage circuit implemented in the DC conversion circuit in FIG. 1 according to an embodiment of the disclosure. The resonant stage circuit 120 includes a first diode D6, a first capacitor C5, a second diode D7, a first inductor L4 and a second capacitor C6. The first diode D6 has an anode end 411 and a cathode end 412. The cathode end 412 of the first diode D6 is coupled to the output end 113, i.e. the positive output end, of the buck-boost converter 110 and the input end 121 of the resonant stage circuit 120. The anode end 411 of the first diode D6 is coupled to the output end 114, i.e. the negative output end, of the buck-boost converter 110 and the input end 122 of the resonant stage circuit 120.

The first capacitor C5 has a first end 421 and a second end 422. The first end 421 of the first capacitor C5 is coupled to the anode end 411 of the first diode D6. The second end 422 of the first capacitor C5 is coupled to the output end 124 of the resonant stage circuit 120 and the load 180.

The second diode D7 has an anode end 432 and a cathode end 431. The cathode end 431 of the second diode D7 is coupled to the anode end 411 of the first diode D6. The first inductor L4 has a first end 441 and a second end 441. The first end 441 of the first inductor L3 is coupled to the anode end 431 of the second diode D7. The second end 442 of the first inductor L4 is coupled to the second end 422 of the first capacitor C5.

The second capacitor C6 has a first end 451 and a second end 452. The first end 451 of the second capacitor C6 is coupled to the output end 123 of the resonant stage circuit 120 and the load 180. The second end 452 of the second capacitor C4 is coupled to the second end 422 of the first capacitor C6. In this embodiment, the input end 121 of the resonant stage circuit 120 is directly coupled to the output end 123 of the resonant stage circuit 120. A capacitance value of the first capacitor C5 is smaller than a capacitance value of the second capacitor C6.

Figure 5:
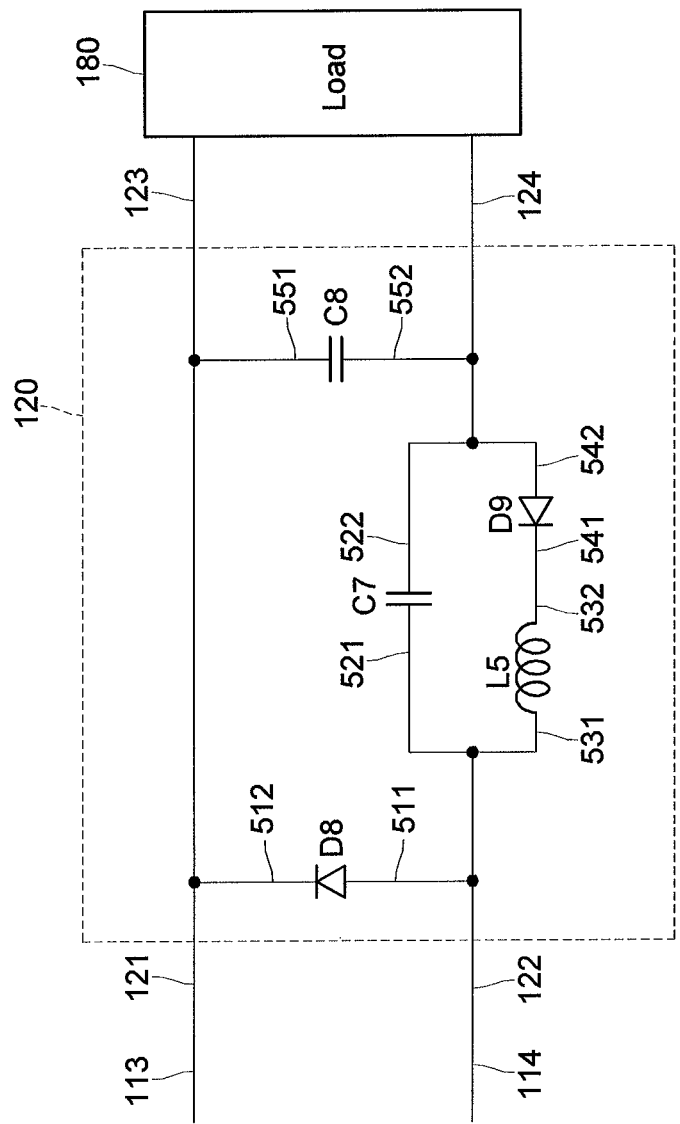
FIG. 5 is a schematic circuit diagram of the resonant stage circuit implemented in the DC conversion circuit in FIG. 1 according to an embodiment of the disclosure.

FIG. 5 is a schematic circuit diagram of the resonant stage circuit implemented in the DC conversion circuit in FIG. 1 according to an embodiment of the disclosure. The resonant stage circuit 120 includes a first diode D8, a first capacitor C7, a first inductor L5, a second diode D9 and a second capacitor C8. The first diode D8 has an anode end 511 and a cathode end 512. The cathode end 512 of the first diode D8 is coupled to the output end 113, i.e. the positive output end, of the buck-boost converter 110 and the input end 123 of the resonant stage circuit 120. The anode end 511 of the first diode D8 is coupled to the output end 114, i.e. the negative output end, of the buck-boost converter 110 and the input end 122 of the resonant stage circuit 120.

The first capacitor C5 has a first end 521 and a second end 522. The first end 521 of the first capacitor C5 is coupled to the anode end 512 of the first diode D6. The second end 522 of the first capacitor C5 is coupled to the output end 124 of the resonant stage circuit 120 and the load 180. The first inductor L5 has a first end 531 and a second end 532. The first end 531 of the first inductor L5 is coupled to the anode end 511 of the first diode D8.

The second diode D9 has an anode end 542 and a cathode end 541. The cathode end 541 of the second diode D9 is coupled to the second end 532 of the first inductor L5. The anode end 542 of the second diode D9 is coupled to the second end 522 of the first capacitor C7.

The second capacitor C8 has a first end 551 and a second end 552. The first end 551 of the second capacitor C8 is coupled to the output end 123 of the resonant stage circuit 120 and the load 180. The second end 552 of the second capacitor C8 is coupled to the second end 522 of the first capacitor C7. In this embodiment, the input end 121 of the resonant stage circuit 120 is directly coupled to the output end 123 of the resonant stage circuit 120. A capacitance value of the first capacitor C7 is smaller than a capacitance value of the second capacitor C8.

Figure 6:
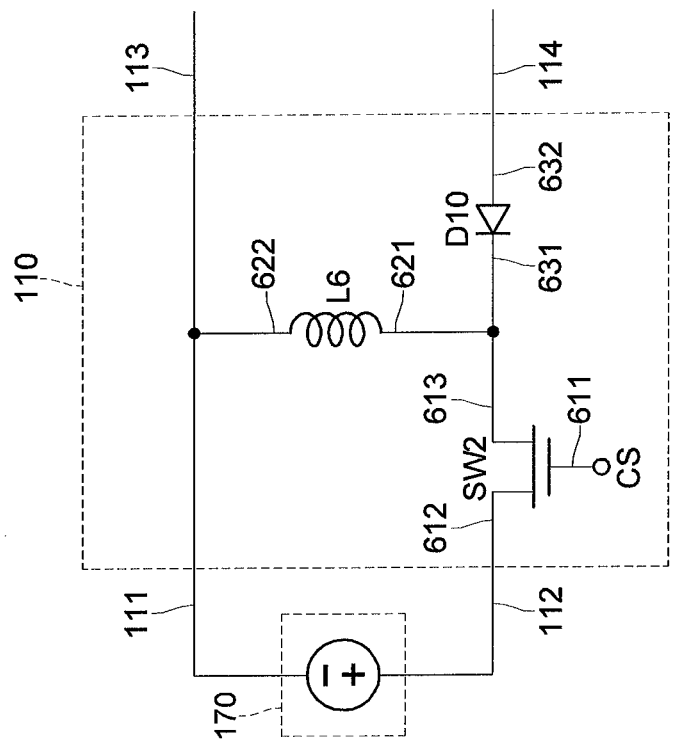
FIG. 6 is a schematic circuit diagram of a buck-boost converter implemented in the DC conversion circuit in FIG. 1 according to an embodiment of the disclosure.

FIG. 6 is a schematic circuit diagram of a buck-boost converter implemented in the DC conversion circuit in FIG. 1 according to an embodiment of the disclosure. The buck-boost converter 110 comprises a switch SW2, a second inductor L6 and a third diode D10.

The switch SW2 has a first end 611, a second end 612 and a third end 613. The first end 611 of the switch SW2 receives a control signal CS. The second end 612 of the switch SW2 is coupled to the input end 112 of the buck-boost converter 110. The second inductor L6 has a first end 621 and a second end 622. The first end 621 of the third inductor L6 is coupled to the third end 613 of the switch SW2. The second end 622 of the third inductor L6 is coupled to the input end 111 of the buck-boost converter 110 and the output end 113, i.e. the positive output end, of the buck-boost converter 110. The third diode D10 has an anode end 632 and a cathode end 631. The cathode end 631 of the third diode D10 is coupled to the first end 621 of the second inductor L6. The anode end 632 of the third diode D6 is coupled to the output end 114, i.e. the negative output end, of the buck-boost converter 110.

Figure 7:
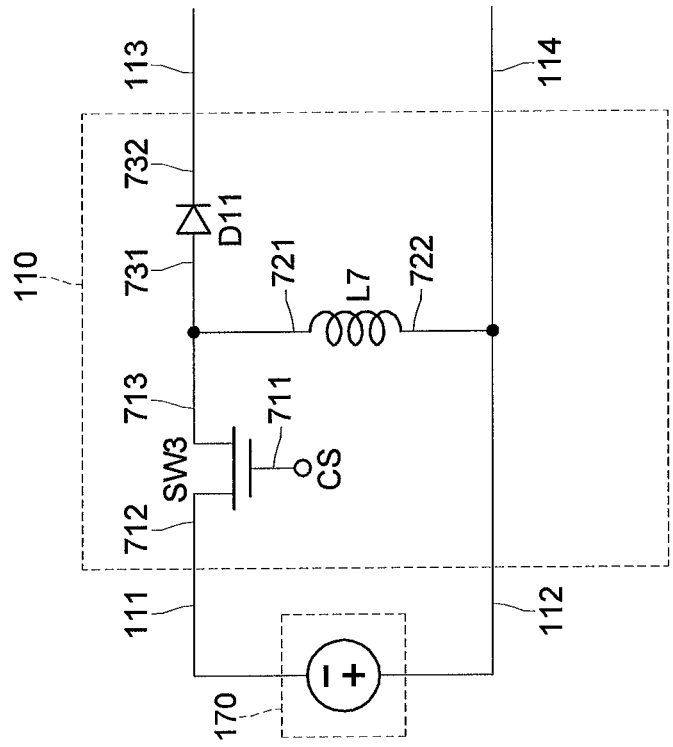
FIG. 7 is a schematic circuit diagram of a buck-boost converter implemented in the DC conversion circuit in FIG. 1 according to an embodiment of the disclosure.

FIG. 7 is a schematic circuit diagram of a buck-boost converter implemented in the DC conversion circuit in FIG. 1 according to an embodiment of the disclosure. The buck-boost converter 110 comprises a switch SW3, a second inductor L7 and a third diode D11.

The switch SW3 has a first end 711, a second end 712 and a third end 713. The first end 711 of the switch SW3 receives a control signal CS. The second end 712 of the switch SW3 is coupled to the input end 111 of the buck-boost converter 110. The second inductor L7 has a first end 721 and a second end 722. The first end 721 of the second inductor L7 is coupled to the third end 713 of the switch SW3. The second end 722 of the second inductor L7 is coupled to the input end 112 of the buck-boost converter 110 and the output end 114, i.e. the negative output end, of the buck-boost converter 110. The third diode D11 has an anode end 731 and a cathode end 732. The anode end 731 of the third diode D11 is coupled to the first end 721 of the second inductor L7. The cathode end 732 of the third diode D11 is coupled to the output end 113, i.e. the positive output end, of the buck-boost converter 110.

Figure 8:
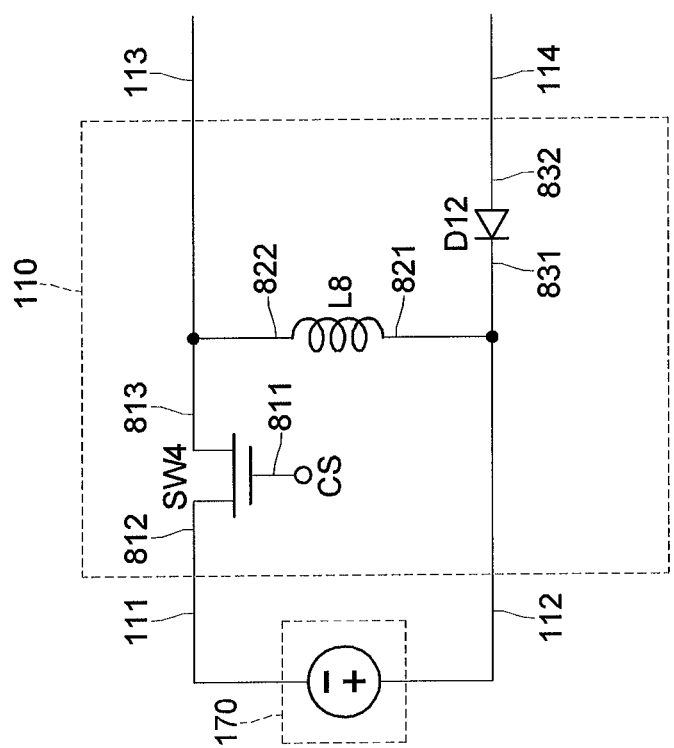
FIG. 8 is a schematic circuit diagram of a buck-boost converter implemented in the DC conversion circuit in FIG. 1 according to an embodiment of the disclosure.

FIG. 8 is a schematic circuit diagram of a buck-boost converter implemented in the DC conversion circuit in FIG. 1 according to an embodiment of the disclosure. The buck-boost converter 110 comprises a switch SW4, a second inductor L8 and a third diode D12.

The switch SW4 has a first end 811, a second end 812 and a third end 813. The first end 811 of the switch SW4 receives a control signal CS. The second end 812 of the switch SW4 is coupled to the input end 111 of the buck-boost converter 110. The third end 813 of the switch SW4 is coupled to the output end 113, i.e. the positive output end, of the buck-boost converter 110. The second inductor L8 has a first end 821 and a second end 822. The first end 821 of the second inductor L8 is coupled to the input end 112 of the buck-boost converter 110. The second end 822 of the second inductor L8 is coupled to the third end 613 of the switch SW4. The third diode D12 has an anode end 831 and a cathode end 832. The cathode end 831 of the third diode D12 is coupled to the first end 821 of the second inductor L8. The anode end 832 of the third diode D12 is coupled to the output end 114, i.e. the negative output end, of the buck-boost converter 110.

As set forth above, a person having ordinary skills in the art is allowed to vary the circuit structures of the buck-boost converter 110 and the resonant stage circuit 120 in FIG. 2A to FIG. 8 according to various applicative requirements to embody the DC conversion circuit 100 in the disclosure. The operation of the DC conversion circuit 100 according to various embodiments can refer to the aforementioned description of the embodiments in FIG. 2A, thereby being not described again hereinafter. Moreover, the DC conversion circuit 100 in every embodiment in the disclosure may have the faster input response, the smaller output voltage ripple and the longer life.

The DC conversion circuit of the disclosure including the buck-boost converter and the resonant stage circuit reverses the polarity of the voltage between the first and second ends of the first capacitor in the resonant stage circuit to form the negative voltage, and whereby a potential barrier of the load voltage may be overcome. In addition, the second diode is disposed between first diode and the first inductor in the resonant stage circuit, so that the DC conversion circuit may have better operation conditions. Additionally, the first capacitor and the second capacitor with smaller capacitance values are employed instead of electrolyze capacitors. Therefore, the design may be made less complicated, and DC conversion circuit may have a faster input response, a smaller output voltage ripple as well as a longer life.

What is claimed is:

1. A DC conversion circuit, comprising:
    a buck-boost converter having two input ends, a negative output end and a positive output end, wherein the two input ends used for receiving a first DC signal, and the negative and positive output ends used for outputting a second DC signal; and
    a resonant stage circuit having two input ends and two output ends, being configured to receive the second DC signal via the input ends of the resonant stage circuit, convert the second DC signal into energy for power charging, and output the energy to a load via the two output ends of the resonant stage circuit, and then being configured to convert the energy, which is used for power charging, to form a negative voltage by a resonance effect, and output the energy to the load via the two output ends of the resonant stage circuit;
    wherein the buck-boost converter comprises:
    a switch having a first end, a second end and a third end, wherein the first end of the switch receives a control signal, the second end of the switch is connected to one of the two input ends of the buck-boost converter, and the third end of the switch is connected to the negative output end of the buck-boost converter;
    a second inductor having a first end and a second end, wherein the first end of the second inductor is connected to the other one of the two input ends of the buck-boost converter, and the second end of the second inductor is connected to the third end of the switch; and
    a third diode having an anode end and a cathode end, wherein the anode end of the third diode is connected to the first end of the second inductor, and the cathode end of the third diode is connected to the positive output end of the buck-boost converter.

2. The DC conversion circuit according to claim 1, wherein the resonant stage circuit comprises:
    a first diode having an anode end and a cathode end, the cathode end of the first diode being coupled to the positive output end of the buck-boost converter and one of the two input ends of the resonant stage circuit, and the anode end of the first diode being coupled to the negative output end of the buck-boost converter and the other one of the two input ends of the resonant stage circuit;
    a first capacitor having a first end and a second end, the first end of the first capacitor being coupled to the cathode end of the first diode, and the second end of the first capacitor being coupled to one of the two output ends of the resonant stage circuit and the load;
    a second diode having an anode end and a cathode end, the anode end of the second diode being coupled to the cathode end of the first diode;
    a first inductor having a first end and a second end, the first end of the first inductor being coupled to the cathode end of the second diode, and the second end of the first inductor being coupled to the second end of the first capacitor; and a second capacitor having a first end and a second end, the first end of the second capacitor being coupled to the second end of the first capacitor, and the second end of the second capacitor being coupled to the other of the two output ends of the resonant stage circuit and the load, wherein the other one of the two input ends of the resonant stage circuit is directly coupled to the other one of the two output ends of the resonant stage circuit.

3. The DC conversion circuit according to claim 2, wherein a capacitance value of the first capacitor is smaller than a capacitance value of the second capacitor.

4. The DC conversion circuit according to claim 1, wherein the resonant stage circuit comprises:
- a first diode having an anode end and a cathode end, the cathode end of the first diode being coupled to the positive output end of the buck-boost converter and one of the two input ends of the resonant stage circuit, and the anode end of the first diode being coupled to the negative output end of the buck-boost converter and the other one of the two input ends of the resonant stage circuit;
- a first capacitor having a first end and a second end, the first end of the first capacitor being coupled to the cathode end of the first diode, and the second end of the first capacitor being coupled to one of the two output ends of the resonant stage circuit and the load;
- a first inductor having a first end and a second end, the first end of the first inductor being coupled to the cathode end of the first diode;
- a second diode having an anode end and a cathode end, the anode end of the second diode being coupled to the second end of the first inductor, and the cathode end of the second diode being coupled to the second end of the first capacitor; and
- a second capacitor having a first end and a second end, the first end of the second capacitor being coupled to the second end of the first capacitor, and the second end of the second capacitor being coupled to the other of the two output ends of the resonant stage circuit and the load, wherein the other one of the two input ends of the resonant stage circuit is directly coupled to the other one of the two output ends of the resonant stage circuit.

5. The DC conversion circuit according to claim 4, wherein a capacitance value of the first capacitor is smaller than a capacitance value of the second capacitor.

6. The DC conversion circuit according to claim 1, wherein one of the two input ends of the resonant stage circuit is directly coupled to one of the two output ends of the resonant stage circuit, and the resonant stage circuit comprises:
- a first diode having an anode end and a cathode end, the cathode end of the first diode being coupled to the positive output end of the buck-boost converter and one of the two input ends of the resonant stage circuit, and the anode end of the first diode being coupled to the negative output end of the buck-boost converter and the other one of the two input ends of the resonant stage circuit;
- a first capacitor having a first end and a second end, the first end of the first capacitor being coupled to the anode end of the first diode, and the second end of the first capacitor being coupled to the other one of the two output ends of the resonant stage circuit and the load;
- a second diode having an anode end and a cathode end, the anode end of the second diode being coupled to the anode end of the first diode;
- a first inductor, having a first end and a second end, the first end of the first inductor being coupled to the cathode end of the second diode, and the second end of the first inductor being coupled to the second end of the first capacitor; and
- a second capacitor having a first end and a second end, the first end of the second capacitor being coupled to the one of the two output ends of the resonant stage circuit and the load, and the second end of the second capacitor being coupled to the second end of the first capacitor.

7. The DC conversion circuit according to claim 6, wherein a capacitance value of the first capacitor is smaller than a capacitance value of the second capacitor.

8. The DC conversion circuit according to claim 1, wherein one of the two input ends of the resonant stage circuit is directly coupled to one of the two output ends of the resonant stage circuit, and the resonant stage circuit comprises:
- a first diode having an anode end and a cathode end, the cathode end of the first diode being coupled to the positive output end of the buck-boost converter and one of the two input ends of the resonant stage circuit, and the anode end of the first diode being coupled to the negative output end of the buck-boost converter and the other one of the two input ends of the resonant stage circuit;
- a first capacitor having a first end and a second end, the first end of the first capacitor being coupled to the anode end of the first diode, and the second end of the first capacitor being coupled to the other one of the two output ends of the resonant stage circuit and the load;
- a first inductor having a first end and a second end, the first end of the first inductor being coupled to the anode end of the first diode;
- a second diode having an anode end and a cathode end, the cathode end of the second diode being coupled to the second end of the first inductor, and the anode end of the second diode being coupled to the second end of the first capacitor; and
- a second capacitor having a first end and a second end, the first end of the second capacitor being coupled to the one of the two output ends of the resonant stage circuit and the load, and the second end of the second capacitor being coupled to the second end of the first capacitor.

9. The DC conversion circuit according to claim 8, wherein a capacitance value of the first capacitor is smaller than a capacitance value of the second capacitor.

10. The DC conversion circuit according to claim 1, wherein the DC signal is from a DC power source or a pulsed power source.

11. The DC conversion circuit according to claim 1, wherein the buck-boost converter comprises:
- a switch having a first end, a second end and a third end, wherein the first end of the switch receives a control signal, and the second end of the switch is coupled to one of the two input ends of the buck-boost converter;
- a second inductor having a first end and a second end, wherein the first end of the second inductor is coupled to the third end of the switch, and the second end of the second inductor is coupled to the other one of the two input ends of the buck-boost converter and the positive output end of the buck-boost converter; and
- a third diode having an anode end and a cathode end, wherein the cathode end of the third diode is coupled to the first end of the second inductor, and the anode end of the third diode is coupled to the negative output end of the buck-boost converter.

12. The DC conversion circuit according to claim 1, wherein the buck-boost converter comprises:
- a switch having a first end, a second end and a third end, wherein the first end of the switch receives a control signal, and the second end of the switch is coupled to one of the two input ends of the buck-boost converter;

a second inductor having a first end and a second end, wherein the first end of the second inductor is coupled to the third end of the switch, and the second end of the second inductor is coupled to the other one of the two input ends of the buck-boost converter and the negative output end of the buck-boost converter; and a third diode having an anode end and a cathode end, wherein the anode end of the third diode is coupled to the first end of the second inductor, and the cathode end of the third diode is coupled to the positive output end of the buck-boost converter.

13. The DC conversion circuit according to claim 1, wherein the buck-boost converter comprises:

a switch having a first end, a second end and a third end, wherein the first end of the switch receives a control signal, the second end of the switch is coupled to one of the two input ends of the buck-boost converter, and the third end of the switch is coupled to the positive output end of the buck-boost converter;

a second inductor having a first end and a second end, wherein the first end of the second inductor is coupled to the other one of the two input ends of the buck-boost converter, and the second end of the second inductor is coupled to the third end of the switch; and a third diode having an anode end and a cathode end, wherein the cathode end of the third diode is coupled to the first end of the second inductor, and the anode end of the third diode is coupled to the negative output end of the buck-boost converter.

\* \* \* \* \*